United States Patent [19]

Thomas

[11] 3,712,273
[45] Jan. 23, 1973

[54] INTERNAL COMBUSTION ROTARY ENGINE

[76] Inventor: Ernest G. Thomas, P.O. Box 1013, Magnolia, Ark. 71753

[22] Filed: Nov. 17, 1971

[21] Appl. No.: 199,573

[52] U.S. Cl. ............................................. 123/8.47
[51] Int. Cl. ............................................. F02b 55/14
[58] Field of Search ......... 123/8.47, 8.49, 8.45, 43 R, 123/43 A, 44 B, 44 D

[56] References Cited

UNITED STATES PATENTS

| | | | |
|---|---|---|---|
| 1,145,627 | 7/1915 | Stradovsky | 123/8.49 X |
| 2,840,058 | 6/1958 | Stringer | 123/8.47 |
| 2,899,945 | 8/1959 | Carvalho | 123/43 B |

Primary Examiner—Clarence R. Gordon

[57] ABSTRACT

An internal combustion engine of the rotary type wherein the fuel is injected into the piston chamber through a valve in the piston head, creating the normal expansion propulsion forces resulting from the explosion of compressed hydrocarbon gases. The piston head itself rotates with a spring-biased plate closing the chamber during the fuel injection phase but blowing open upon the explosion of the fuel, producing a jetting effect, causing the piston head to recoil and rotate producing motive force.

3 Claims, 5 Drawing Figures

PATENTED JAN 23 1973

INVENTOR.
ERNEST G. THOMAS
BY
ATTORNEYS

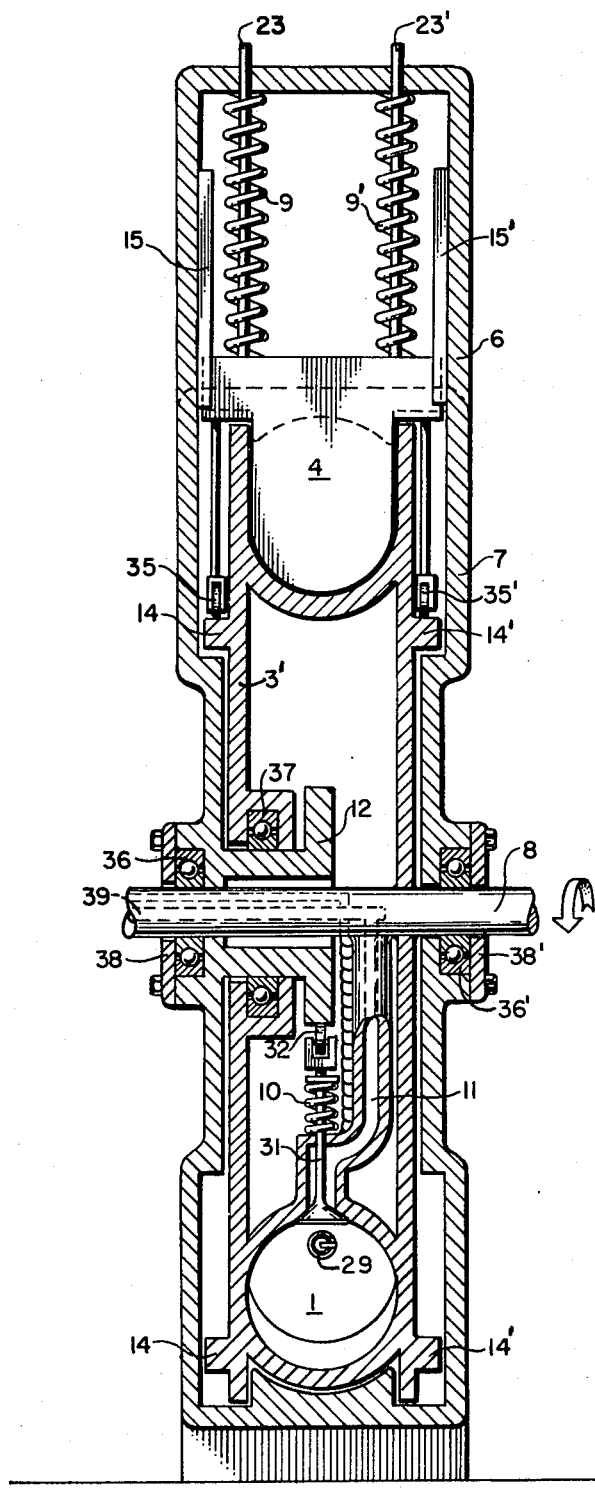
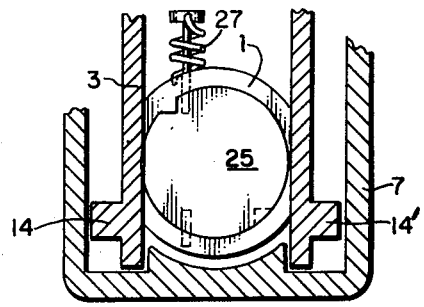
FIG. 3
FIG. 5
INVENTOR.
ERNEST G. THOMAS
ATTORNEYS

PATENTED JAN 23 1973 3,712,273

INVENTOR.
ERNEST G. THOMAS

INTERNAL COMBUSTION ROTARY ENGINE

REFERENCE TO RELATED APPLICATION

The present invention is a variation of the basic rotary engine described in this inventor's copending patent application Ser. No. 61,143, filed Aug. 5, 1970, now abandoned and entitled "Rotary Steam Engine." The present invention is directed to an internal combustion type while the copending application is directed to a steam engine type having a jetting effect.

BACKGROUND OF THE INVENTION

The present invention has particular application to the rotary engine for directly converting explosive heat energy into rotary mechanical motion, more particularly, explosive heat energy which results from the ignition of hydrocarbon gases.

The need in our industrial society for rotating mechanical motion has been with us since the invention of the wheel and this need has been fulfilled by various energy converters developed down through the years. A chronological list of these energy converters would be the water mill, the sand mill, the animal powered mill, the steam powered mill, the steam engine and finally, the hydrocarbon gas engine. It is this last catagory of engine that the present invention is concerned with.

The hydrocarbon gas engine of today has been time tested as one of the finest energy converters of all times. However, although it is one of the finest energy converters, it still leaves a lot to be desired in the area of efficiency. The modern day piston reciprocating hydrocarbon vapor engine loses a substantial amount of energy in converting the potential energy that exists in the hydrocarbon into usable rotary mechanical motion. Most of this energy lost is due to friction of moving parts which cannot be completely eliminated.

However, certain engines are more efficient than others in that they have fewer moving parts. The rotary engine which we are dealing with in this present invention has far fewer moving parts than the comparable reciprocating engine, and there is a direct relationship between the number of moving parts of an engine and the efficiency which normally can be expected from it.

The present invention combines the simplified rotary type of piston and the internal combustion system most common to piston type engines to give a superior economic advantage over prior art engines. The present invention includes a rotating piston encased within a housing which provides an elongated combustion cylinder or chamber. The inner piston chamber is normally closed by a biased plate which opens up upon the internal explosion of the fuel.

The fuel injection system consists of intake valves and exhaust valves situated in the head of the piston and which are activated by a cam type lobe located on the shaft. A spark mechanism is also located internal to the rotating piston and can be adjusted for either continuous or intermittent spark depending on the application or needs of the rotary engine.

A forced oxygen supply is featured such that a compressor driven by the rotary engine compresses air, which is conducted through the hollow main shaft and into the rotating piston head and is allowed into the chamber by the operation of the previously mentioned valve and lobe mechanism. The hydrocarbon fuel is injected into this forced oxygen supply line by either a conventional injection method or a conventional carburetion system depending on the application of the rotary engine.

An inner connected gear operated abutment is located perpendicular to the rotating piston which is positioned in the chamber directly behind the rotating piston as it is about to fire so that the explosion forces of the ignited hydrocarbon fuel will be directed against said abutment, causing the piston to be forced in and around its circular path. The movement of the piston causes the attached shaft to rotate, supplying the rotary mechanical motion which is used as a motive force.

As compared to piston reciprocating engines or other nonvalve in head rotary engines, the present invention offers an economic solution which is much cheaper to build as well as cheaper to operate and maintain. Additionally, the rotary engine of the present invention is relatively smaller as compared to the existing hydrocarbon reciprocating engines of equal horsepower.

BRIEF DESCRIPTION OF THE DRAWINGS

FIGS. 3 and 4 are cross-sectional side and front views, respectively, through the center line of the engine housing showing the inner structure of the engine.

FIG. 5 is a cross-sectional view along section lines 5—5 showing a front view of one element of the inner structure of the engine.

DESCRIPTION OF PREFERRED EMBODIMENT

STRUCTURE OF THE ENGINE

Figure 1:
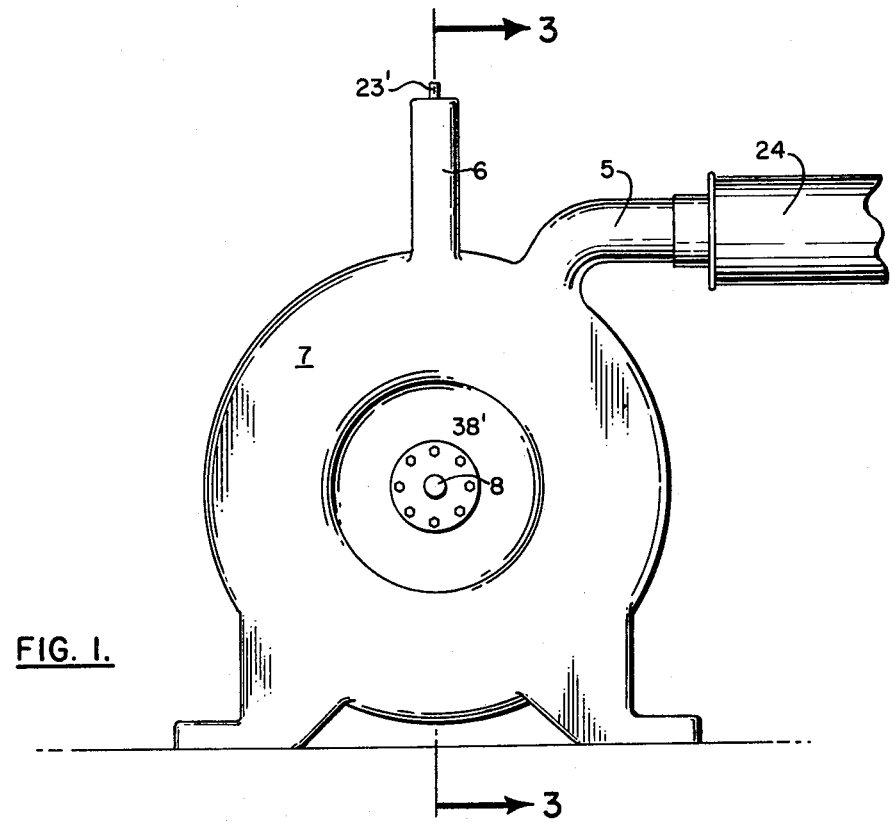
FIGS. 1 and 2 are front and side views, respectively, of the rotary engine of the present invention.

As illustrated in FIGS. 1 through 5, the rotary engine of the present invention comprises an outer housing 7 defining a curved engine "cylinder" 3 in which a rotating piston chamber 1 rotates. The rotating piston chamber 1 along with the rest of the central, inner structure 3' which also rotates is manufactured of sufficiently heavy material so that its rotating action will act as a momentum conserving device, analogous to a flywheel. This flywheel type action helps give the drive shaft 8 a more uniform motion rather than having the jerky motion which naturally would result from the periodic firing of the engine.

The piston chamber or head 1 is equipped with a sparking mechanism 2, a fuel inlet port 13 and a spring-biased outlet port or plate 25. The sparking device 2 is located at the forward end of the piston head 1 and includes spark plug 29 which is electrically activated by the electrical power source or battery 20 connected through the ignition wire 28.

The fuel inlet port 13 includes a spring 10 which biases valve 31 in a normally closed position. The fuel inlet port 13 is opened and closed by the cam 12. The end of the valve 31 is equipped with a cam valve stem wheel 32 which rides on the cam 12 which is stationary with respect to the rotating piston chamber 1.

Figure 4:
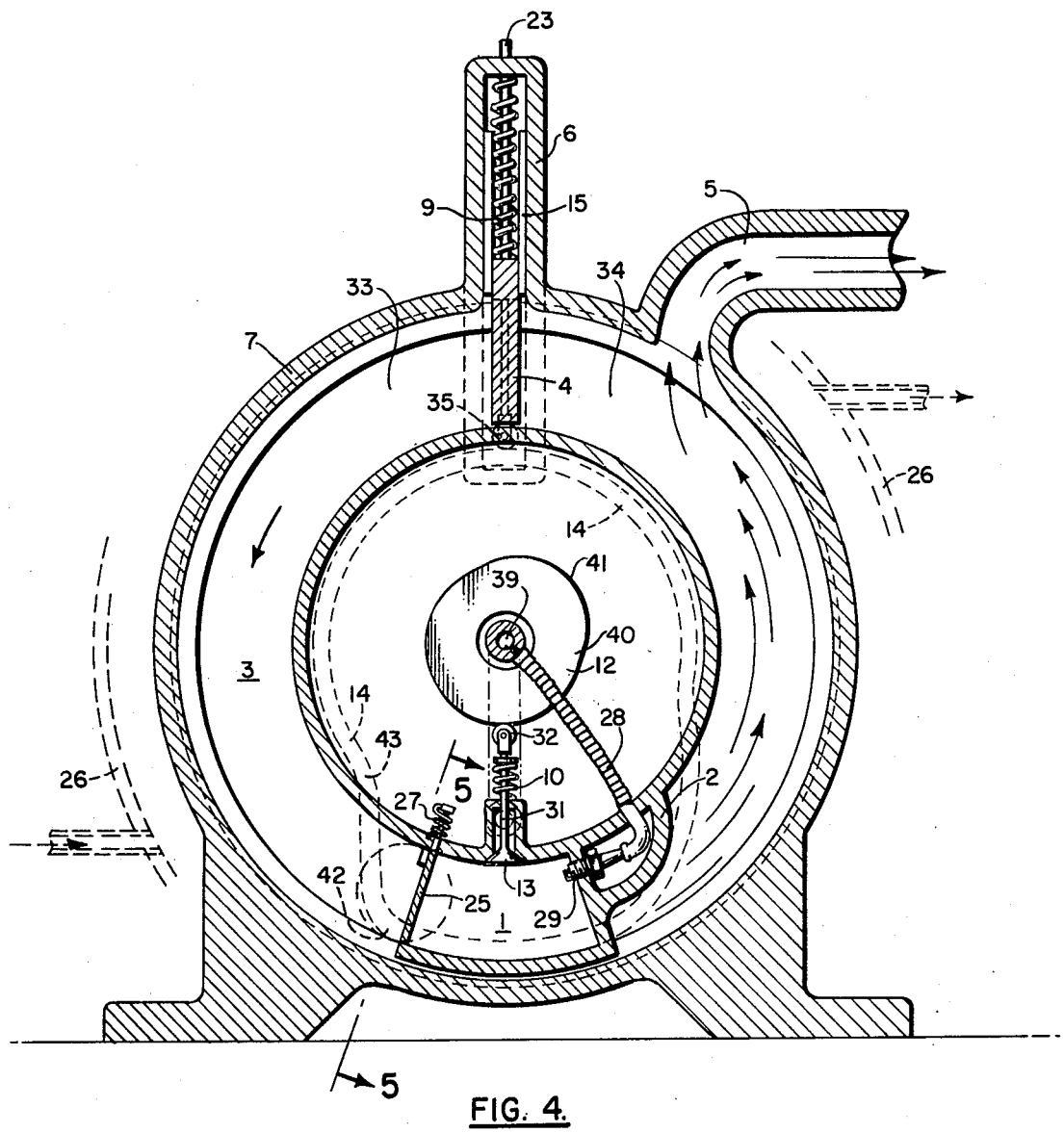

As shown in FIGS. 4 and 5, the expanding gas outlet port 25 consists of a flap valve, spring-biased shut by spring 27, that maintains the fuel vapors within the chamber 1 until ignition takes place. Upon ignition of the gases the flap valve 25 will rotate 90° against the action of spring 27, permitting the rapidly expanding gases to escape the piston head 1. These expanding gases by a jetting action have an opposite and equal force with respect to the piston 1 which causes the piston head 1 to move in a counterclockwise direction as illustrated in FIG. 4.

This jet action is enhanced by the placement of abutment 4 at the upper end of the curved engine cylinder 3 which traps the expanding gases between it and the moving piston head 1. This increased pressure area, marked 33 in FIG. 4, and the atmospheric pressure area, marked 34 in FIG. 4, (the two pressure areas being separated by the moveable piston head 1) causes the piston head 1 to move in the direction from area 33 to area 34.

Occupying the area 34 in front of the piston head 1 and before the abutment 4 is the exhaust fumes from the previous cycle of the rotary engine. These exhaust gases exit the rotary engine at exhaust port 5 essentially open to the atmosphere except for the added facility of a noise muffler 24 (note FIG. 1).

The abutment 4, situated at top dead center of the rotary engine as illustrated in FIG. 4, is cam operated somewhat similar to the fuel inlet valve 13. However, in this case, the cams 14 and 14' rotate with the piston head 1 while the valve stem wheels 35 and 35' of the abutment 4 remain stationary except for vertical movement. The abutment 4 is spring biased against the cams 14 and 14' by springs 9 and 9', respectively, held in position by guide rods 23 and 23', respectively. In its lowermost position as illustrated in FIG. 4, the abutment 4 seals area 33 from area 34, isolating the pressure differentials after explosion.

When the piston 1 is at top dead center, the abutment 4 is pushed up into the housing 6 by the valve stem wheels 35 and 35' riding on cams 14 and 14', respectively. To further facilitate and guide the upward movement of abutment 4, alignment guides 15 and 15' are supplied to insure a directly vertical movement of the abutment 4.

The inner rotary element 3' on which the piston head 1 is attached is afixedly mounted on shaft 8 which is rotatably mounted in housing 7 through bearings 36 and 36'. Bearing 37 is supplied to allow the rotary element 3' to ride on the stationary cam 12. Cover plates 38 and 38' are supplied to retain the bearings 36 and 36', respectively, within the recessed encasement cast within the housing 7.

The ignition electrical supply wire 28 and the fuel supply line 39 are located internally to shaft 8, as illustrated by the phantom lines in FIG. 3. The entire rotary engine is enclosed by a cooling water jacket 26 as schematically illustrated in FIG. 4.

Figure 2:
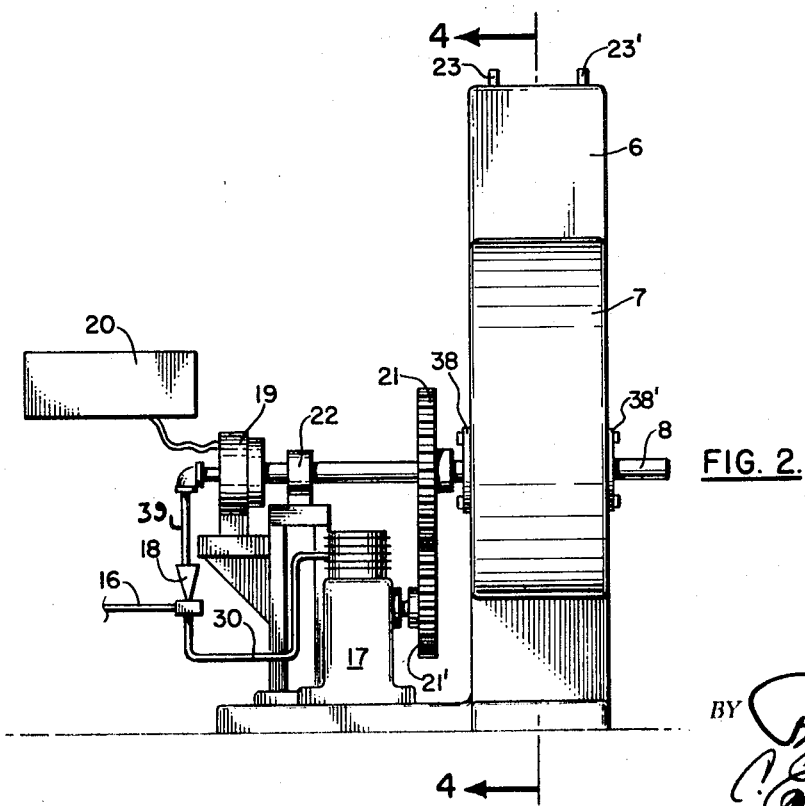

As shown in FIG. 2, a liquid gas supply line 16 meets with compressed air line 30 at an eductor 18 which mixes the correct combination of gas and air which is then forced into the internal fuel supply line 39. The compressed air is supplied by compressor 17 driven by gears 21 and 21' directly off of the main drive shaft 8. From the eductor 18 the gas and air mixture is fed into the shaft 8 through a rotary contactor 19. Also the electrical supply 20 is fed into the rotary connector 19 so that the electrical power can be transmitted to the internal shaft 8 by means of line 28 and from there to the piston head 1. A bearing 22 is provided to support the drive shaft 8 at its extended position between gear 21' and the rotary connector 19 for the fuel and ignition power.

Operation of the Engine

The inner rotary element 3' with piston head 1 attached is illustrated in FIG. 4 in the bottom dead center position. As the piston head 1 continues in its counterclockwise direction, the exhaust fumes are pushed out of the exhaust port 5. As it moves in this counterclockwise direction, the cam valve stem wheel 32 rides on the stationary cam 12. As the cam wheel 32 reaches the point 40 on the cam 12, the wheel is climbing up the cam lobe, thereby compressing the spring 10 and opening the fuel intake valve 13. At point 41 on the cam lobe valve stem wheel 32 carrying valve 13 is at the full, open position and the fuel is being admitted into the piston head chamber 1.

It is at this approximate point that the abutment wheels 35 and 35' start to climb the gradual cam lobes 14 and 14', respectively, opening the curved "cylinder" 3 by raising the abutment 4. Proceeding now in even a further counterclockwise direction, abutment wheels 35 and 35' reach the point 42 on the rotating cams 14 and 14'. Up to point 42, the abutment 4 has been completely opened by being pushed up against springs 9, 9' while being guided on inner guides 23 and 23' and peripheral guides 15 and 15', respectively, during the passing of the piston chamber 1. It is at point 42 that the abutment 4 starts a fast decent down to the closed position. At point 43 on the cams 14 and 14', the abutment 4 is in a fully closed position and at this point the spark is initiated in the internal piston head 1.

When the electrical sparking mechanism 20 produces its electrical charge, ignition of the fuel contained in piston head 1 is effectuated. The ignition of the hydrocarbon fuel causes the gases contained in the piston head 1 to explode and expand rapidly. The first chain of events is to cause an extremely high pressure against the flat valve 25 which heretofore was spring biased closed with spring 27. This pressure causes the flat valve to rotate 90°, allowing the expanding gases to flow from the piston head, causing an equal and opposite reaction upon the piston 1. An additional impetus to the piston head 1 is caused by the expanding gases coming into abrupt contact with the abutment 4, previously described, placed in the path of the expanding gases, creating a high pressure head.

After the fuel contained within the piston head 1 is ignited, the piston moves in a counterclockwise direction, pushing the previously ignited fuel from the previous cycle ahead of it and out the exhaust port 5. It should be noted at this point that the abutment 4 prevents the exhaust gases from moving into area 33 of the curved engine "cylinder" 3.

The design of the cams 14 and 14' are particularly effective in increasing or decreasing the efficiency of the engine. It should be noted that a shorter piston head with a shorter dwell time of the abutment 4 in the open position will produce a more efficient engine, although not as powerful because it would decrease the amount of fuel which could be contained and exploded in piston head 1.

The gradual rise in the cam on the forward side of the piston 1 as compared to the steep incline of the cams 14 and 14' on the reverse end of piston head 1 has been supplied to reduce the amount of friction and mechanical energy required to open the abutment 4, and also bring abutment 4 back down to the closed position as soon as possible. This permits the occurrence of a quicker firing of the fuel contained in the chamber and thereby causes a longer burning time.

It should be noted that the configuration of the abutment 4 and the piston head 1 are merely exemplary and the actual structures thereof can be co-designed so as to give a closer mating action as they pass each other to minimize pressure loss. In order to smooth or even out the action of the rotating power take off shaft 8, rather than a single rotary chamber as shown in FIGS. 1 through 5, several rotary chambers could be ganged on a single shaft. A ganging of two such chambers firing at 180° from each other would give the effect of smoothing out the power takeoff 8 and of course, additional rotary chambers would smooth out the operation even further and add to the horsepower of the engine. Likewise, the 360° that the piston chamber 1 travels can be divided into several sections, each with its own exhaust port 5 and abutment 4, allowing ignition of fuel in the chamber 1 several times for each rotation. Likewise the design and mounting details of the port or gate plate 25 can be varied to produce a more substantial or longer lasting opening and closing device, as desired or needed.

Thus as indicated by the exemplary modifications discussed above, many changes and variations of course can be made in the detailed embodiment disclosed without departing from the spirit and the scope of the present invention. Indeed, most of the details described and illustrated are merely exemplary in nature.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. An internal combustion engine comprising at least one piston member and one generally closed engine cylinder, said piston member being mounted for continuous, 360° rotation inside said curved cylinder about a central axis, said piston member structurally defining an internal combustion chamber, said piston member further including fuel inlet means for introducing combustible fuel into said chamber, sparking means for igniting and exploding the combustible fuel, and gate means for opening and closing said chamber with respect to said curved cylinder, said gate means normally remaining closed and thereby defining a relatively small internal combustion chamber but rapidly being opened upon the explosion of the combustible fuel to permit escape of the exploding gases into said cylinder driving the piston member around said cylinder; whereby, prior to combustion, the combustible fuel is confined to a relatively small area, while upon combustion the gases are allowed to expand into a relatively large area.

2. The engine of claim 1 wherein said gate means is a flap valve which is normally spring-biased closed.

3. The engine of claim 1 wherein said cylinder includes a normally closed abutment closing off said cylinder, said abutment being mounted to open upon the approach and passage of said piston member during each cycle.

* * * * *